United States Patent [19]

Kumar et al.

[11] Patent Number: 5,674,604
[45] Date of Patent: Oct. 7, 1997

[54] MAGNETIC RECORDING MEDIUM COMPRISING MAGNETIC PARTICLES, BINDER, AND A NON HALOGENATED VINYL OLIGOMER DISPERSANT

[75] Inventors: Ramesh C. Kumar, Maplewood; Suman K. Patel, Woodbury, both of Minn.

[73] Assignee: Minnesota Mining and Manufacturing Company, St. Paul, Minn.

[21] Appl. No.: 414,783

[22] Filed: Mar. 31, 1995

[51] Int. Cl.$^6$ .................................................... G11B 5/702
[52] U.S. Cl. ................ 428/323; 428/522; 428/694 BG; 428/900
[58] Field of Search ...................... 428/694 BG, 323, 428/522, 900; 526/342

[56] References Cited

U.S. PATENT DOCUMENTS

| | | | |
|---|---|---|---|
| 3,149,996 | 9/1964 | Wagner et al. | 428/694 B |
| 3,542,739 | 11/1970 | Krimm et al. | 260/77.5 |
| 3,607,675 | 9/1971 | Haines | 204/10 |
| 3,843,593 | 10/1974 | Shell et al. | 260/40 |
| 3,929,659 | 12/1975 | Graham | 252/62.54 |
| 3,976,626 | 8/1976 | Turck | 526/78 |
| 4,004,997 | 1/1977 | Tsukamoto et al. | 204/159.14 |
| 4,222,909 | 9/1980 | Brixius et al. | 260/18 |
| 4,242,184 | 12/1980 | Ford | 204/98 |
| 4,244,987 | 1/1981 | Aydia et al. | 427/130 |
| 4,431,769 | 2/1984 | Yoshida et al. | 524/555 |
| 4,529,661 | 7/1985 | Ninomiya et al. | 428/425.9 |
| 4,612,244 | 9/1986 | Kaneda et al. | 428/323 |
| 4,690,870 | 9/1987 | Okita et al. | 428/425.9 |
| 4,770,941 | 9/1988 | Imai et al. | 428/411.1 |
| 4,783,370 | 11/1988 | Chernega et al. | 428/425.9 |
| 4,784,913 | 11/1988 | Nakamura et al. | 428/411.1 |
| 4,784,914 | 11/1988 | Matsufuji et al. | 428/418 |
| 4,830,923 | 5/1989 | Sumiya et al. | 428/425.9 |
| 4,837,082 | 6/1989 | Harrell et al. | 428/329 |
| 4,842,942 | 6/1989 | Yatsuka et al. | 428/425.9 |
| 4,851,465 | 7/1989 | Yamakawa et al. | 524/431 |
| 4,861,683 | 8/1989 | Nakachi et al. | 428/694 |
| 4,876,149 | 10/1989 | Ramharack | 428/425.9 |
| 4,900,631 | 2/1990 | Yamakawa et al. | 428/483 |
| 5,008,357 | 4/1991 | Nakachi et al. | 526/292.2 |
| 5,024,892 | 6/1991 | Watanabe et al. | 428/423.1 |
| 5,028,676 | 7/1991 | Nakachi et al. | 526/277 |
| 5,037,934 | 8/1991 | Yasuda et al. | 528/72 |
| 5,063,119 | 11/1991 | Ishida et al. | 428/694 |
| 5,064,730 | 11/1991 | Takano et al. | 428/694 |
| 5,068,258 | 11/1991 | Naguchi | 522/31 |
| 5,081,213 | 1/1992 | Carlson | 528/73 |
| 5,096,774 | 3/1992 | Sano et al. | 428/323 |
| 5,098,783 | 3/1992 | Watanabe et al. | 428/323 |
| 5,126,202 | 6/1992 | Inaba et al. | 428/402 |
| 5,132,383 | 7/1992 | Larson et al. | 526/292.2 |
| 5,134,035 | 7/1992 | Kumar et al. | 428/425.9 |
| 5,139,892 | 8/1992 | Nakachi et al. | 428/694 |
| 5,151,330 | 9/1992 | Kumamoto et al. | 428/425.9 |
| 5,153,053 | 10/1992 | Hashimoto et al. | 428/215 |
| 5,178,953 | 1/1993 | Anglin | 428/424.6 |
| 5,221,582 | 6/1993 | Yamakawa | 428/425.9 |
| 5,240,972 | 8/1993 | Kumar et al. | 522/57 |
| 5,242,752 | 9/1993 | Isobe et al. | 428/329 |
| 5,244,739 | 9/1993 | Carlson et al. | 428/425.9 |
| 5,268,407 | 12/1993 | Hayashi et al. | 524/398 |
| 5,320,914 | 6/1994 | Nakamura et al. | 428/694 |

FOREIGN PATENT DOCUMENTS

| | | |
|---|---|---|
| 0 272 022 | 6/1988 | European Pat. Off. .......... C08F 2/08 |
| 0 312 228 | 4/1989 | European Pat. Off. ...... C08F 220/18 |
| 0 326 864 | 8/1989 | European Pat. Off. . |
| 0622785A2 | 2/1994 | European Pat. Off. . |
| 54-46518 | 4/1979 | Japan . |
| 54-46519 | 4/1979 | Japan . |
| 54-84708 | 7/1979 | Japan . |
| 55-15278 | 2/1980 | Japan . |
| 55-15279 | 2/1980 | Japan . |
| 55-15281 | 2/1980 | Japan . |
| 01106324 | 9/1980 | Japan . |
| 57-141020 | 9/1982 | Japan . |
| 59-219304 | 12/1984 | Japan . |
| 60-182017 | 9/1985 | Japan . |
| 61-026132 | 6/1986 | Japan . |
| 62-030162 | 2/1987 | Japan . |
| 62-073417 | 4/1987 | Japan . |
| 63-112820 | 5/1988 | Japan . |
| 01073523 | 3/1989 | Japan . |
| 02012613 | 1/1990 | Japan . |
| 02053219 | 2/1990 | Japan . |
| 2-077415 | 3/1990 | Japan . |
| 02129217 | 5/1990 | Japan . |
| 2-208310 | 8/1990 | Japan . |
| 03041618 | 2/1991 | Japan . |
| 03141018 | 6/1991 | Japan . |
| 03203020 | 9/1991 | Japan . |
| 03224128 | 10/1991 | Japan . |
| 03224129 | 10/1991 | Japan . |
| 03224130 | 10/1991 | Japan . |
| 61-059623 | 11/1992 | Japan . |
| 1 574 721 | 9/1980 | United Kingdom . |

OTHER PUBLICATIONS

Polym. Prep. (ACS Div. Polym. Chem.) 24(2), 126–9 (1983).
Brochure, Sekisui Chemical Co., Ltd., Chemical Specialty, Polyvinyl Acetal Resins, etc. (Jul. 1992).
Brochure, CPS Chemical Company, Inc., Amine and Quaternary Monomers (Publication date prior to Apr. 27, 1993).

*Primary Examiner*—Stevan A. Resan
*Attorney, Agent, or Firm*—Gary L. Griswold; Walter N. Kirn; Daniel C. Shulte

[57] ABSTRACT

The present invention provides a non-halogenated vinyl oligomer wherein the oligomer comprises a plurality of pendant nitrile groups and at least one pendant dispersing group; wherein the oligomer has a glass transition temperature of about 60° to about 105° C. and a number average molecular weight of about 2000 to about 4000 and the equivalent weight of the dispersing group(s) is about 500 to about 50,000. The invention also provides magnetic recording media comprising these dispersants.

8 Claims, No Drawings

MAGNETIC RECORDING MEDIUM COMPRISING MAGNETIC PARTICLES, BINDER, AND A NON HALOGENATED VINYL OLIGOMER DISPERSANT

FIELD OF THE INVENTION

This invention relates to non-plasticizing high glass transition temperature (Tg) dispersants. This invention also relates to magnetic recording media comprising these dispersions.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment. The magnetic layer may also include other components such as lubricants, abrasives, thermal stabilizers, catalysts, crosslinkers, antioxidants, dispersants, wetting agents, etc.

It is desirable to have as high a loading of magnetizable pigment in the magnetic recording media as is reasonably possible. It is often preferred to have a binder dispersion comprising from about 70% to 85% by weight magnetizable pigment relative to the total binder dispersion (binder and pigment) with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents and dispersants, are often employed to facilitate such dispersion. For higher pigment loading, i.e., the use of greater amounts of weight and number of magnetizable particles, greater amounts of such dispersants are often required, which is not always desirable. There are a number of reasons for using as little dispersant as possible. Costs, for example, can be reduced by using less dispersant. Further, excess dispersant may have a tendency to act as a plasticizer and soften the magnetic coating or bloom from a cured binder dispersion over time. This can cause increased debris to collect on the recording surface leading to contamination of a recording head or the like, or causing a change in the physical or chemical characteristics of the magnetic media.

Another problem in the art is that the viscosity of a binder/magnetic pigment dispersion generally increases with higher loading of magnetizable pigment. If the dispersion is too viscous, it can be difficult to apply to the substrate, and good magnetic orientation of the pigment, i.e., a squareness ratio of 0.75 or more, can be more difficult to obtain. The squareness ratio (Br/Bm), which is the ratio of the remnant saturation induction, or saturation magnetization (Br), to the saturation induction, or saturation magnetization (Bm), refers to the effectiveness of the orientation of the magnetic particles. For randomly oriented particles, the squareness ratio is 0.5 and for ideally and perfectly oriented particles, the ratio is equal to 1.0. Values for the squareness ratio, of media exhibiting good performance, normally fall around 0.75 to 0.85, with higher values being significantly better. In general, an increase in the squareness ratio is reflected by an improvement in orientation characteristics and electromagnetic properties and an increase from 0.75 to 0.80 (i.e. an increase of 0.05) results in a significant advantage. The difference between a 0.75 and a 0.85 squareness ratio typically represents about a 1 decibel improvement in electromagnetic properties such as signal-to-noise ratio.

To help alleviate these problems with high pigment loading, binder compositions having internal dispersants have been developed. Such compositions comprise polymers with functional moieties pendant from the polymer backbone that help disperse the magnetizable pigment. U.S. Pat. No. 5,139,892, incorporated by reference herein, describes in detail these binder resins. U.S. Pat. No. 5,139,892 describes self-wetting binders including binders which comprise a quaternary ammonium salt as a wetting/dispersing group. As a result of using these compositions, less dispersant is needed for dispersing the magnetizable pigment in the binder.

There are, however, certain types of media constructions where high glass transition temperature (Tg) and abrasion resistance in the uncured state, and high final coating modulus and glass transition are both desirable and necessary, for example, where stiffer tapes are needed for better handling in a recording and playback machine, or where manufacturing methods dictate the necessity of having high initial strength coatings that are resistant to damage during manufacture or processing. These types of magnetic media run "cleaner" because they are smoother and resist shedding adherent debris which often can occur with softer, lower Tg binders.

In order to increase the durability, running properties, and reliability of magnetic recording media, attempts have been made to add a hard material to the pigment containing binder. Single polymer systems have been developed in which a "hard resin" is grafted onto a polyurethane having pendant hydroxy and sulfonate groups rather than blended therewith (See U.S. Pat. Nos. 5,244,739 and 5,134,035, assigned to the assignee of the present case). Additionally, efforts have been made to develop a single polymer magnetic binder system which does not need to be blended with a hard resin, which can be "tailor" made from a wide variety of monomers so that a wide spectrum of physical properties can be introduced, which possesses a high Tg, which possesses good mechanical properties, which disperses pigment well, and which is capable of being cross-linked by isocyanate curatives (See U.S. Pat. No. 5,240,972 assigned to the assignee of the present case).

The approach of using binders to achieve dispersibility and specific physical properties in a magnetic dispersion generates quality material, however it tends to be limited to the types of monomers which can be employed, and the range of properties that can be derived from the various copolymer blends.

Typically, dispersants are added to improve the dispersibility of the magnetic particles in a magnetic coating dispersion. Commercially available low Tg (less than −10° C.) dispersants such as POCA II, available from 3M, which is a phosphate ester which is prepared by direct esterification of a triol with one mole of phosphoric acid resulting in an average of two hydroxy groups and an average of one triol unit per phosphate and BG-510, available from Rhone Poulenc, which is a polyether phosphate ester mixture of 90% monoester and 10% diester, are commonly used in magnetic dispersions. When these low molecular weight, low Tg dispersants are added to a higher Tg binder polymer or polymer blend the resultant Tg of the mixture is lowered. This lowered Tg will be manifest in a softer, plasticized coating with an overall lowered modulus. Additionally, the low Tg uncrosslinked material such as POCA II material in the dispersion can potentially migrate to the surface of the media. This can result in magnetic media with higher friction, higher levels of adherent debris, and in general lower durability.

Attempts have been made to overcome the disadvantages of these known dispersants. However, these attempts have not been successful.

High Tg polyurethanes have been included in flexible magnetic recording media containing low Tg dispersants in attempts to increase the Tg of the magnetic media. However, this method is disadvantageous in that the resulting magnetic layer is not very calenderable. The use of conventional high Tg vinyl chloride/vinyl acetate, vinyl alcohol terpolymers in such binder systems containing low Tg dispersants result in durability problems in the resulting recording media. U.S. Pat. No. 5,178,953 describes the use of low molecular weight, high Tg, vinyl binders having one or more primary hydroxyl groups to increase the Tg of both the binder system and the magnetic layer of the magnetic recording medium. But they also have to add low molecular weight dispersant to obtain smooth and coatable dispersion which decreases the overall Tg of the composite.

SUMMARY OF THE INVENTION

The present invention provides a dispersant which avoids the drawbacks associated with low Tg dispersants by being a non-plasticizing high Tg material which acts not only as a dispersant in a magnetic dispersion but which also acts to impart specific desirable physical properties to the cured magnetic media coating.

The dispersant of the present invention comprises a non-halogenated vinyl oligomer wherein the oligomer comprises a plurality of pendant nitrile groups and at least one pendant dispersing group; wherein the oligomer has a glass transition temperature of about 60° to about 105° C. and a number average molecular weight of about 2000 to about 4000, and wherein the equivalent weight of the dispersing group is about 500 to about 50,000. These materials when used as dispersants in combination with wetting and non-wetting binders yield low viscosity dispersions.

The dispersant of the present invention preferably has a glass transition temperature of about 80° to about 105° C., most preferably about 95° to about 105° C. If the Tg is greater than about 105° C. the resultant coating may be too brittle. If the Tg is less than about 60° C. the resultant coating may be too soft. If the number average molecular weight of the dispersant is greater than about 4000, a thixotropic dispersion may result. The dispersant of the present invention typically has a polydispersity of about 2 to about 4, preferably about 2.3 to about 3.2, and most preferably about 2 to about 2.5. Magnetic coatings prepared from the dispersions of the invention have lower Rodenstock (typically about 4–5.5) and higher gloss values indicating improved dispersions and smoother coatings. A key advantage of these dispersants of the present invention over other conventional dispersants is that these dispersants have a relatively high glass transition temperature (Tg) (typically greater than about 80° C.) and can impart desirable physical properties to resultant magnetic coatings such as high Tg, abrasion resistance in the uncured state, high final coating modulus and a reduced tendency to shed adherent debris resulting in a cleaner running product.

A magnetic recording medium, comprising a magnetic layer provided on a magnetizable substrate, wherein the magnetic layer comprises a polymeric binder and a magnetic pigment dispersed in the polymers binder by a dispersant, wherein the dispersant comprises: non-halogenated vinyl oligomer wherein the oligomer comprises a plurality of pendant nitrile groups and at least one pendant dispersing group; wherein the oligomer has a glass transition temperature of about 60° to about 105° C. and a number average molecular weight of about 2000 to about 4000, and wherein the equivalent weight of the dispersing group is about 500 to about 50,000.

Definitions of Terms

Throughout this specification, the prefix "(meth)acryl-" means "methacryl-" or "acryl-".

Detailed Description of the Invention

Magnetic Recording Media of the Invention

Magnetic recording media of the present invention comprise a magnetic layer provided on a nonmagnetizable substrate. The particular nonmagnetizable substrate of the present invention may be formed from any suitable substrate material known in the art. Examples of suitable substrate materials include, for example, polymers such as polyethylene terephthalate ("PET"); metals such as aluminum, or copper; paper; or any other suitable material.

The components of the magnetic layer comprise a magnetic pigment dispersed in a polymeric binder. Typically, the magnetic layer comprises about 3 to about 10 weight percent dispersant based upon the total weight of magnetic pigment present. The type of magnetic pigment used in the present invention may include any suitable magnetic pigment known in the art including $\gamma$-$Fe_2O_3$, $Fe_3O_4$, $CrO_2$, barium ferrite, barium ferrite derivatives, metal particles, and the like. Preferably the Tg of the magnetic layer is greater than about 70° C.

The magnetic layer of the magnetic recording medium of the invention typically comprises about 60 to about 85 percent by weight pigment, about 1 to about 6 percent by weight dispersant, and about 4 to about 20 percent by weight binder based upon the total weight of pigment, dispersant plus binder. Typically the magnetic layer comprises about 2 to about 10 percent by weight hard binder and about 2 to about 10 percent by weight soft binder based upon the total weight of disperant plus pigment plus binder.

An example of a polymeric binder useful in the present invention is a nonhalogenated vinyl copolymer having a plurality of pendant nitrile groups which is described in a pending U.S. application Ser. No. 08/054,312, assigned to the assignee of the present invention, incorporated by reference herein. Vinyl chloride based binders can also be used in the present invention and are described in U.S. Pat. Nos. 5,221,582 and 5,139,892 both incorporated by reference herein. Other useful binders include but are not limited to those selected from the group consisting of polyurethanes. Representative examples of suitable polyurethane polymers include polyester polyurethanes, polyether polyurethanes, polyether polyester polyurethanes, polycarbonate polyurethanes, polyester polycarbonate polyurethanes, polycaprolactone polyurethanes, mixtures thereof, and the like.

The oligomeric dispersant of the present invention has a plurality of nitrile groups. Representative examples of monomers that can provide such nitrile groups include (meth)acrylonitrile, $\beta$-cyanoethyl-(meth)acrylate, cyanomethyl(meth)acrylate, $\beta$-cyanoethylethoxyether- (meth)acrylate, p-cyanostyrene, p-(cyanomethyl)styrene, and the like. Preferably, the nitrile functional, nonhalogenated vinyl monomer is (meth)acrylonitrile, and more preferably acrylonitrile.

Dispersant of the Invention

The oligomeric dispersant of the present invention contains at least one pendant dispersing group and optionally one or more pendant hydroxyl groups. The pendant hydroxyl groups of the oligomeric dispersant not only facilitate dispersion of the magnetic pigment in the oligomeric dispersant, but also promote solubility, cure, and compatibility with other polymers. The hydroxyl groups may be primary, secondary, or tertiary, although primary and secondary hydroxyl groups are preferred. Preferred oligomeric dispersants of the present invention generally have a hydroxyl equivalent weight in the range from about 300 to about 10,000, preferably about 500 to about 5000, more preferably about 800 to about 1500.

In order to provide an oligomeric dispersant having a plurality of pendant hydroxyl groups, one or more nonhalogenated, hydroxyl functional, vinyl monomers may be incorporated into the dispersant. Representative examples of suitable nonhalogenated, hydroxyl functional, vinyl monomers include an ester of an $\alpha,\beta$-unsaturated carboxylic acid with a diol, e.g., 2-hydroxyethyl (meth)acrylate, or 2-hydroxypropyl (meth)acrylate; 1- or 2- glyceryl (meth)acrylate; 1,3- or 2,3-dihydroxypropyl (meth)acrylate; an adduct of an $\alpha,\beta$-unsaturated carboxylic acid with caprolactone; an alkanol vinyl ether such as 2-hydroxyethyl vinyl ether; 4-vinylbenzyl alcohol; allyl alcohol; p-methylol styrene; or the like. Preferably, the nonhalogenated, hydroxyl functional, vinyl monomer is selected from the group consisting of 2-hydroxyethyl (meth)acrylate, 2-hydroxypropyl (meth)acrylate, and mixtures thereof. Alternatively, oligomeric dispersants with pendant hydroxyl groups can also be prepared by incorporating vinyl acetate into the dispersant and then partially or fully hydrolyzing the acetate moieties to produce hydroxyl groups.

The dispersing group of the oligomeric dispersant facilitates dispersion of the magnetic pigment. Dispersing groups in the oligomeric dispersant may be the same, or they may be different. It is desirable that the vinyl oligomer have a dispersing group equivalent weight in the range from about 500 to about 50,000, preferably about 500 to about 4,000 and most preferably about 500 to about 3,000.

As used throughout this specification, the term "dispersing group" refers to a group that is capable of wetting the magnetic pigment. Preferably, the dispersing group is a group that is ionized or ionizable at a pH in the range from 2 to 10. Representative examples of suitable dispersing groups include quaternary ammonium moieties (e.g., $-N(CH_3)_3^+Cl^-$ as one example), amines (e.g., $-N(CH_3)_2$ as one example), heterocyclic moieties as described in U.S. Pat. No. 5,081,213, sulfobetaines, salts or acids based on sulfate (e.g., $-OSO_3Na$ as one example), salts or acids based on sulfonate (e.g., $-SO_3Na$ as one example), salts or acids based on phosphate (e.g., $-OPO(OH)_2$ as one example), salts or acids based on phosphonate (e.g., $-PO(OH)_2$ as one example), salts or acids based on carboxyl (e.g., $-COONa$ as one example), mixtures thereof, and the like.

One or more dispersing groups can be introduced into the oligomeric dispersant in a variety of ways. As one approach, dispersing initiators may be used. Dispersing initiators initiate copolymerization of vinyl monomers to provide vinyl copolymers with terminal dispersing groups. Examples of suitable dispersing initiators include 4,4'-azobis (cyanovaleric acid), succinic acid peroxide, potassium persulfate, and sodium perphosphate. Another approach for introducing the dispersing group into the oligomeric dispersant is to use a functional chain transfer agent such as mercaptosuccinic acid during copolymerization of the vinyl monomers.

The dispersing group may also be introduced into the oligomeric dispersant through the use of a nonhalogenated, vinyl monomer bearing a dispersing group. Representative examples of suitable nonhalogenated, vinyl monomers bearing a dispersing group include (meth)acryloyloxyethyl trimethyl ammonium chloride, (meth)acryloyloxyethyl acid phosphate, (meth)acrylamidopropyl trimethylammonium chloride, (meth)acryloyloxypropyl dimethylbenzylammonium chloride, vinylbenzyl trimethylammonium chloride, 2-hydroxy-3-allyloxypropyl trimethylammonium chloride, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, dimethylaminoethyl (meth)acrylate, maleic anhydride, N-(3-sulfopropyl)-N-(meth) acryloxyloxy-ethyl-N,N-dimethylammonium betaine, 2-[(meth)-acryloyloxy]ethyl trimethylammonium methosulfate, N-(3-sulfopropyl)-N-(meth)acrylamidopropyl-N,N-dimethylammonium betaine, vinylbenzyl trimethylammonium chloride, mixtures thereof, and the like.

A dispersing group may also be introduced into the oligomeric dispersant using suitable polymer reactions. Examples of suitable polymer reactions to provide the dispersing group include: (1) reaction of succinic anhydride with a portion of the hydroxyl groups on a vinyl oligomer to produce an oligomeric dispersant with pendant acid functionality; and (2) reaction of a tertiary amine with the epoxy groups on a vinyl oligomer to produce an oligomeric dispersant with pendant quaternary ammonium groups. In order to provide an oligomeric dispersant having pendant epoxy groups for this reaction, nonhalogenated, epoxy-functional vinyl monomers may be incorporated into the oligomeric dispersant. Such monomers include, for example glycidyl ether of an unsaturated alcohol such as allyl glycidyl ether, a glycidyl ester such as glycidyl (meth)acrylate, and the like.

Preferred oligomeric dispersants of the present invention are oligomers of monomers comprising (meth)acrylonitrile; a nonhalogenated, vinyl monomer bearing a dispersing group as described above; and one or more nonhalogenated, nondispersing, vinyl monomers. The term "nondispersing" means that the monomer bears no dispersing group and no hydroxyl group.

Representative examples of suitable copolymerizable, nonhalogenated, nondispersing, vinyl monomers include styrene; alkylated styrenes; alkoxy styrenes; vinyl naphthalene; alkylated vinyl naphthalenes; alkoxy vinyl naphthalenes; (meth)acrylamides; N-vinyl pyrrolidone; linear, branched, or alicyclic alkyl esters of (meth)acrylic acid wherein the alkyl groups contain from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or alicyclic; isobornyl (meth)acrylate; glycidyl (meth)acrylate vinyl acetate; allyl (meth)acrylate, and the like. Preferred nonhalogenated, nondispersing, vinyl monomers include styrene, alkyl-substituted styrenes, alkyl (meth)acrylates wherein the alkyl group contains 1 to 4 carbon atoms, and mixtures thereof.

Most preferably, the nonhalogenated, nondispersing, vinyl monomer is selected from styrene, methyl (meth)acrylate, and mixtures thereof.

One particularly preferred nonhalogenated vinyl oligomer of the present invention (hereinafter referred to as the "Preferred Oligomeric Dispersant") is a nonhalogenated vinyl copolymer of monomers comprising 5 to 40, preferably 15 to 40, parts by weight of (meth)acrylonitrile; 30 to 80 parts by weight of one or more nonhalogenated, nondispersing, vinyl monomers; and 0.5 to 20, preferably 2 to 12, most preferably 5 to 10 parts by weight of a nonhalogenated, vinyl monomer bearing a dispersing group.

For the Preferred Oligomeric Dispersant, the dispersing group is preferably selected from the group consisting of quaternary ammonium, acid or salt of carboxyl, acid or salt of phosphate or phosphonate, acid or salt of sulfate or sulfonate, and mixtures thereof. More preferably, the dispersing group is acid or salt of phosphate or phosphonate. When the dispersing group is phosphoric acid, it is preferred that the vinyl monomer bearing a dispersing group is phosphoxy ethyl methacrylate or phenyl ester of phosphoxy ethyl methacrylate such as,

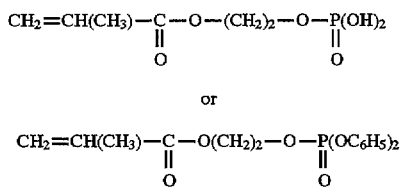

for example.

Preferably, the nonhalogenated, nondispersing, vinyl monomer of the Preferred Oligomeric Dispersant is selected from styrene; an alkyl ester of (meth)acrylic acid wherein the alkyl group of the alkyl ester has 1 to 20 carbon atoms; and a blend comprising styrene and such an alkyl ester wherein the weight ratio of styrene to the alkyl ester is in the range from 10:90 to 90:10. For Preferred Oligomeric Dispersants containing such an alkyl ester, the alkyl ester is preferably methyl (meth)acrylate, and more preferably methyl methacrylate.

Nonhalogenated vinyl oligomers of the present invention may be prepared by free-radical polymerization methods known in the art, including but not limited to bulk, solution, emulsion and suspension polymerization methods. For example, according to the solution polymerization method, oligomers of the present invention are prepared by dissolving the desired monomers in an appropriate solvent, adding a chain-transfer agent, and a free-radical polymerization initiator, sealing the solution in an inert atmosphere such as nitrogen or argon, and then agitating the mixture at a temperature sufficient to activate the initiator.

Solvents useful in such polymerizations can vary according to solubility of the monomers and additives. Typical solvents include but are not limited to those selected from the group consisting of ketones such as acetone, methyl ethyl ketone, 3-pentanone, methyl isobutyl ketone, diisobutyl ketone, and cyclohexanone; alcohols such as methanol, ethanol, propanol, n-butanol, isopropanol, isobutanol, cyclohexanol and methyl cyclohexanol; esters such as ethyl acetate, butyl acetate, isobutyl acetate, isopropyl acetate, and the like; aromatic hydrocarbons such as benzene, toluene, xylenes, cresol, and the like; ethers such as diisopropyl ether, diisobutyl ether, tetrahydrofuran, and dioxane; and aprotic solvents such as dimethylformamide, dimethylsulfoxide and the like, and mixtures thereof. The preferred solvent for preparation of the oligomeric dispersants of the present invention is methyl ethyl ketone (MEK) because it is also the preferred medium in which the magnetic dispersions, described below, are prepared due to the ready solubility therein of polyurethane-vinyl oligomer blends.

Chain transfer agents suitable for solution polymerization include but are not limited to alcohols, mercaptans, certain halogenated small molecules such as carbon tetrabromide, and mixtures thereof. Preferably, the chain transfer agent is selected from the group consisting of carbon tetrabromide, isooctylthioglycolate, mercaptosuccinic acid, mercaptopropane diol, dodecyl mercaptan, ethanol and carbon tetrachloride. Most preferably, the chain transfer agent is mercaptopropane diol.

Free-radical polymerization initiators suitable for solution polymerization include those that are soluble in the reaction solvent and that are thermally activated, including but not limited to azo compounds, peroxides, and mixtures thereof. Useful peroxide initiators include those selected from the group consisting of benzoyl peroxide, lauroyl peroxide, di-t-butyl peroxide, and the like, and mixtures thereof. Useful azo compound initiators include those selected from the group consisting of 2,2'-azobis(2-methylbutyronitrile); 2,2'-azobis(isobutyronitrile); and 2,2'-azobis(2,4-dimethylpentanenitrile); each of which is commercially available as VAZO™ 67, VAZO™ 64, and VAZO™ 52, respectively, from E. I. Du Pont de Nemours and Co. The preferred thermal polymerization initiator is the VAZO™ 64 brand initiator because of its ease of use and its half-life characteristics (e.g., at 64° C., half-life is 10 hours).

The oligomeric dispersant of the present invention may also be prepared by emulsion polymerization methods. Typically, an emulsion comprising vinyl monomers, a chain-transfer agent and a water-soluble redox-type initiator system is prepared in an inert atmosphere, then heated carefully until a reaction exotherm occurs. The reaction mixture is stirred and cooled and the resulting latex is collected. Optionally, an ionic or nonionic surfactant may be added to the reaction mixture. Oxidation-reduction ("Redox") free-radical initiators useful in the invention include but are not limited to those chosen from the group consisting of tertiary amines with organic peroxides (exemplified by the N,N-diethylaniline-benzoyl peroxide pair, etc.); organic halides with transition metal complexes (exemplified by the carbon tetrachloride-molybdenum hexacarbonyl pair); inorganic oxidation-reduction systems (exemplified by the potassium persulfate-sodium metabisulfite pair, etc.); and organic-inorganic systems (exemplified by the 2-mercaptoethanol-$Fe^{+3}$ pair, etc.). Inorganic redox initiators are preferred for the oligomers of the invention because of their ease of handling and useful reaction temperature range.

Test Methods

Gloss

"Gloss" refers to the percentage of light incoming at 45° that is reflected at an observation angle of 45° measured via a Pacific Scientific Glossgard II 45° glossmeter.

Rodenstock Value

"Rodenstock Value" is a measure of smoothness of a coating and is measured using a RODENSTOCK RM-400 surface finish analyzer commercially available from Rodenstock Co. Generally, a lower Rodenstock value corresponds to a smoother surface.

Surface Roughness

An average RMS surface roughness, in nm, is measured by a Wyko high resolution interferometer.

Composite Tg

The Composite Tg is measured by coating the dispersions made in Examples 3.1 through 3.7 and 4.1 through 4.7 on a silicone release liner. The coatings were made on a silicone release liner using a knife coater. The resultant coatings were dried at 40° C. for 4 hours in a vacuum oven (5 mm Hg pressure). The media was peeled off and was subjected to Differential Scanning Calorimetry (DSC) for Tg measurement.

EXAMPLES

The invention is further illustrated by the following non limiting examples. All parts, percentages, ratios, etc. in the examples and the rest of the specification are by weight unless otherwise specified.

Example 1—Preparation of St/AN/PEM/MPD, 65/22/10/3

An 8 oz.(237 ml) amber bottle was charged with 32.5 grams of styrene (St), 11.0 grams of acrylonitrile (AN), 5.0 grams of phosphoxy ethyl methacrylate (PEM), 1.5 grams of mercapto propanediol (MPD), 0.5 gram of Vazo™ 64 2,2'-azobisisobutyronitrile initiator, and 75 grams of methylethylketone (MEK). The resulting clear solution was purged with $N_2$ at 1 liter per minute for 5 minutes. The bottle was then sealed and tumbled in a constant temperature bath at 70° C. for 48 hours. The percentage conversion of this reaction was determined to be 99% and the resulting polymer had an inherent viscosity (IV) of 0.099 dl/g in MEK at 23° C. and a Tg of 86° C.

Example 2—Preparation of St/MMA/AN/PEM/MPD, 32.5/32.5/22/10/3

This sample was prepared according to the method which was described in Example 1 except that the charges were as follows: 16.25 grams styrene, 11.0 grams acrylonitrile, 16.25 grams methyl methacrylate (MMA), 5.0 grams phosphoxy ethyl methacrylate, 1.5 grams mercapto propanediol, 0.5 grams Vazo™64 initiator and 75 grams methylethylketone. The percentage conversion after 48 hours was 99% and the resulting polymer had an IV of 0.121 dl/g in MEK at 23° C. and a Tg of 91° C.

Comparative Examples 3.1–3.3 and Examples 3.4–3.7

Preparation of Magnetic Dispersions and Magnetic Media with Binders Containing Wetting Groups Magnetic dispersions were prepared to evaluate the effectiveness of Examples 1 and 2. The effectiveness of Examples 1 and 2 were compared to the effectiveness of two commercially available phosphate containing dispersants POCA II (available from 3M) and BG-510 (available from Rhone Poulenc). Magnetic dispersions were prepared with a binder resin blend of Hard Resin Binder A/Soft Resin Binder B. The synthesis of Hard Resin (Styrene/Acrylonitrile/HPA/QMA, 67/22.5/10/0.5) is described in copending U.S. application Ser. No. 08/054,312, assigned to the assignee of the present invention incorporated by reference herein and is also described herein. The Soft Resin Binder B is a mercapto succinic acid polyester polyurethane which is described in a pending application assigned to the assignee of the present case,. U.S. application Ser. No. 08/054,511, incorporated by reference herein. Both of these resins contain wetting groups which help the resin wet out the magnetic pigment.

Hard Resin Binder A

Hard Resin Binder A was made as follows: 167.5 g styrene, 56.3 g acrylonitrile, 26.0 g 2-hydroxy propyl acrylate (HPA), 2.5 g quaternary ammonium methacrylate (QMA), 0.5 g mercapto propane diol, 1.25 g 2-2'-azobisisobutyronitrile (AIBN) and 375.0 g methyl ethyl ketone were charged in an approximately 700 ml amber bottle. The resultant admixture, which contained some undissolved quaternary ammonium methacrylate was purged for 5 minutes at 1 liter per minute after which the bottle was sealed. The sealed bottle and its contents were tumbled in a constant temperature both at 65° C. for 60 hours. The product was a clear, homogeneous solution of IV=0.35 dl/g in MEK at 23° C.

Soft Resin Binder B

Soft Resin Binder B which is a polyurethane with mercapto succinic acid wetting groups, was made as follows.

To a 100 l reactor were added 7.5 kg TONE™0210 polycaprolactone diol (17.7 eq) having a number average molecular weight of about 825 and a hydroxy equivalent weight of about 415, available from Union Carbide, 1.9 kg neopentyl glycol (36.7 eq), 10.2 g dibutyltin dilaurate, and 27 kg MEK. Next, 8.9 kg diphenylmethane-4,4'- diisocyanate ("MDI") (71.2 eq) was added. The resultant mixture was heated at reflux for 1 hour, after which 195.8 g mercaptosuccinic acid (1.5 eq) were added. Then, 6.6 kg TONE™0305 polycaprolactone triol having a number average molecular weight of about 540 and a hydroxy equivalent weight of about 180, available from Union Carbide (36.7 eq), and an additional 9 kg MEK were added. Heating at reflux continued for an additional 2 hours, after which infrared spectroscopic analysis showed that all of the anhydride and all of the isocyanate had been consumed. An additional 590 g MDI (4.72 eq) was added and the mixture was heated at reflux for an additional hour. The mixture showed an inherent viscosity in tetrahydrofuran of 0.28 dl/g. The mercaptosuccinic acid equivalent weight of the resultant polyurethane was calculated to be 19,600, and the hydroxyl equivalent weight was calculated to be 1425.

Dispersion Preparation

To prepare each dispersion, the vinyl copolymer solution (Hard Resin Binder A) the polyurethane solution (Soft Resin Binder B) and methyl ethyl ketone (MEK) were combined in an approximately 700 ml glass jar and thoroughly mixed. The amounts are reported in Table 1. Next, Dowa HM-31 metal particle magnetic pigment available from Dowa, was added under nitrogen. The nitrogen was removed and mixing continued using a high shear mixer. The resulting mixture was then charged to an Igarashi mill containing ceramic media and milled for eight to ten hours at 1500 rpm. The following dispersions of Comparative Examples 3.1–3.3 and Examples 3.4–3.7 were prepared. All quantities reported are in grams in Table 1 unless indicated otherwise.

TABLE 1

| Component[1] | Comp. Ex. 3.1 | Comp. Ex. 3.2 | Comp. Ex. 3.3 | Ex. 3.4 | Ex. 3.5 | Ex. 3.6 | Ex. 3.7 |
|---|---|---|---|---|---|---|---|
| A[2] (38.1% in MEK) | 75.21 | 68.5 | 68.9 | 68.96 | 68.44 | 62.69 | 62.67 |
| B[3] (42.3% in MEK) | 44.58 | 41.46 | 41.5 | 41.36 | 41.72 | 37.88 | 37.54 |
| MEK | 255 | 259 | 259 | 255 | 254 | 253 | 255 |
| HM-31 (pigment) | 128 | 128 | 128 | 128 | 128 | 128 | 128 |
| BG-510 (50% in MEK) | — | — | 9.76 | — | — | — | — |
| POCA (75% in TOL[6]) | — | 5.55 | — | — | — | — | — |
| Ex. 1[4] (39% in MEK) | — | — | — | 9.78 | — | 19.56 | — |
| Ex. 2[5] (39% in MEK) | — | — | — | — | 9.91 | — | 19.67 |

[1]Percentages are by weight-all other values are in grams
[2]Hard Binder Resin A
[3]Soft Resin Binder B
[4]Example 1 polymer
[5]Example 2 polymer
[6]Toluene A handspread coating was prepared from each dispersion described in Table 1. The coating was made on a polyester substrate using a knife coater. The wet coating thickness was set at 2 mils and an orienting field was applied. The Gloss and Rodenstock values were determined for each of the coatings and are reported in Table 2. "Rodenstock value" is a measure of the smoothness of a coating and was measured using a RODENSTOCK RM-400 surface finish analyzer commercially available from Rodenstock Co. Generally, a lower Rodenstock value corresponds to a smoother surface.

TABLE 2

| Ex. | Dispersant* | Composite Tg | Gloss | Rodenstock |
|---|---|---|---|---|
| Comp. 3.1 | None | 60° C. | 97 | 5.3 |
| Comp. 3.2 | 3% POCA II | 50° C. | 79 | 5.5 |
| Comp. 3.3 | 3% BG-510 | 50° C. | 68 | 5.8 |
| 3.4 | 3% Ex. 1[1] | 76° C. | 100 | 5.4 |
| 3.5 | 3% Ex. 2[2] | 77° C. | 96 | 5.1 |
| 3.6 | 6% Ex. 1[1] | 80° C. | 83 | 5.4 |
| 3.7 | 6% Ex. 2[1] | 82° C. | 84 | 5.1 |

[1]Example 1 polymer
[2]Example 2 polymer
*Percentages based on weight of metal particle pigment The data in Table 2 indicate that the conventional dispersants, POCA II and BG-510, significantly reduce the gloss, and composite Tg. These changes are due to increased surface roughness and lower quality dispersion. When used with resins containing wetting groups, the dispersants of the present invention Example 1 polymer and Example 2 polymer) did not adversely effect these measurements. Actually, the Tg of the composite is increased which means such media could be run in state of the art high temperature recording magneto resistive heads which can attain a temperature of up to 50°–70° C.

Comparative Examples 4.1–4.3 and Examples 4.4–4.7

Preparation of Magnetic Dispersions and Magnetic Media with Hard Resin Containing Wetting Groups and Soft Resin that Does Not Contain Wetting Groups Magnetic dispersions were prepared to evaluate the effectiveness of the oligomers of Examples 1 and 2. The effectiveness of the oligomers of Examples 1 and 2 were compared to the effectiveness of two commercially available phosphate containing dispersants POCA II (available from 3M) and BG-510 (available from Rhone Poulenc). Magnetic dispersions were prepared with a binder resin blend Hard Resin Binder A/soft Resin C. Resin C is a polyurethane binder prepared from neopentyl glycol, RUCOFLEX-S-1019–35™ polyester diol available from Ruco polymer Corporation and methylene diisocyanate from Aldrich. The polyurethane used in this blend does not contain any wetting groups.

Resin C

Resin C was prepared as follows

To a 250 ml flask were added 22 g RUCOFLEX-S-1019-35™ polyester diol available from Ruco Polymer Corporation, 2 g neopentyl glycol and 60 g methyl ethyl ketone. To the resulting solution was added 11 g diphenylmethane-4,4'-diisocyanate "MDI". The resultant mixture was heated at 80° C. for 2 hours, after which infrared spectroscopic analysis showed that all of the isocyanate had been consumed. The mixture showed an inherent viscosity in tetrahydrofuran (THF) of 0.4 dl/g at 23° C.

Each Dispersion was prepared using the same procedures as outlined in Example 3. The following dispersions were prepared. All quantities reported are in grams unless indicated otherwise.

TABLE 3

| Component* | Comp. Ex. 4.1 | Comp. Ex. 4.2 | Comp. Ex. 4.3 | Ex. 4.4 | Ex. 4.5 | Ex. 4.6 | Ex. 4.7 |
|---|---|---|---|---|---|---|---|
| A[1] (38.1% in MEK) | 74.41 | 68.61 | 69.54 | 68.75 | 68.39 | 62.45 | 62.38 |
| C[2] (36.4% in MEK) | 52.12 | 48.45 | 48.10 | 49.32 | 49.18 | 43.98 | 44.06 |
| MEK | 246 | 252 | 249 | 248 | 248 | 249 | 251 |
| HM-31 (pigment) | 128 | 128 | 128 | 128 | 128 | 128 | 128 |
| BG-510 (50% in MEK) | — | — | 7.84 | — | — | — | — |
| POCA II (75% in TOL[5]) | — | 5.10 | — | — | — | — | — |

TABLE 3-continued

| Component* | Comp. Ex. 4.1 | Comp. Ex. 4.2 | Comp. Ex. 4.3 | Ex. 4.4 | Ex. 4.5 | Ex. 4.6 | Ex. 4.7 |
|---|---|---|---|---|---|---|---|
| Ex. 1[3] (39% in MEK) | — | — | — | 9.80 | — | 19.53 | — |
| Ex. 2[4] (39% in MEK) | — | — | — | — | 9.81 | — | 19.58 |

*Percentages are by weight-all other values are in grams.
[1]Hard Resin Binder A
[2]Resin C
[3]Example 1 polymer
[4]Example 2 polymer
[5]Toluene Handspread coatings were prepared from each dispersion described in Table 3. The coating was made on a polyester substrate using a knife coater. The wet coating thickness was set at 2 mils and an orienting field was applied. The Gloss and Rodenstock values were determined for each of the coatings and are reported in Table 4.

TABLE 4

| Ex. | Dispersant* | Composite Tg | Gloss | Rodenstock |
|---|---|---|---|---|
| Comp 4.1 | None | 62° C. | 41 | 11.0 |
| Comp 4.2 | 3% POCA II | 51° C. | 40 | 9.6 |
| Comp 4.3 | 3% BG-510 | 49° C. | 35 | 12.2 |
| 4.4 | 3% Ex. 1[1] | 75° C. | 49 | 8.6 |
| 4.5 | 3% Ex. 2[2] | 74° C. | 53 | 8.0 |
| 4.6 | 6% Ex. 1[1] | 81° C. | 62 | 6.8 |
| 4.7 | 6% Ex. 2[2] | 83° C. | 60 | 6.6 |

*Percentages based a weight or weight of metal particle pigment.
[1]Example 1 polymer
[2]Example 2 polymer Table 4 shows clearly that the dispersants of the present invention (Example 1 polymer and Example 2 polymer) increase the gloss (smoother surface finish) of the cured resin and reduce the Rodenstock (more uniform dispersions) when compared to the control (Comp. Ex. 4.1) without any dispersant. The use of the softer, lower Tg conventional dispersants like POCA II and BG-510 (Comp. Ex. 4.2 and Comp. Ex. 4.3) has a negative impact on the cured resin's gloss and Rodenstock values and reduces the composite Tg while addition of Example 1 dispersant and Example 2 dispersant increases the Tg of the composite thus making it more durable.

Comparative Examples 5.1 and 5.3 and Examples 5.2 and 5.4: Coatings Prepared from Magnetic Dispersions Containing Non-plasticizing, High Tg Dispersants Each dispersion was prepared and coated using the procedures given below.

MEK, vinyl copolymer solution (Hard Resin Binder A), polyurethane solution (Resin C) and the Ex. 1 oligomer dispersant solution were added to an enclosed, water-cooled, high shear mixing kettle. The mixture was mixed for 15 minutes while cooling and purging with nitrogen. When the oxygen level reached 1.0% the nitrogen flow was reduced to the minimum level required to maintain an oxygen level of 1.0%.

Next, Dowa HM-31 was added. Mixing was continued for one hour then Ceralox 0.4 alumina powder was added and mixing was continued for two hours. The $N_2$ purging/water cooling was discontinued and the contents of the kettle were transferred to a five gallon pail. A sufficient amount of MEK was then added to the pail to achieve 35% solids. The contents of the pail were mixed under a high shear mixer for an additional hour.

The mixture was then charged to a Netzsch 4-liter horizontal sand mill containing 0.8–1.0 mm ceramic media. The mixture was milled until smooth (typically 6–8 passes) using pass to pass milling with a shaft speed of approximately 1850 RPM and a flow rate of approximately 0.5 (GPM). After milling, the dispersion was thinned with a sufficient quantity of MEK, xylene and methyl isobutyl ketone (MIBK) to achieve a 90/5/5 by weight MEK/xylene/MIBK solvent blend and an approximately 31–32% solids dispersion. The thinned dispersion was filtered through a Nippon Roki HT 50 filter (8 micron rating) followed by a Nippon Roki HT-30 filter (3.5 micron rating).

The formulations of Examples 5.1–5.4 are shown in Table 5. All quantities reported are in kilograms unless indicated otherwise.

TABLE 5

| Component* | Comp. Ex. 5.1 | Ex. 5.2 | Comp. Ex. 5.3 | Ex. 5.4 |
|---|---|---|---|---|
| A[1] (40% in MEK) | 1.84 | 1.63 | 1.84 | 1.43 |
| B[2] (40% in MEK) | 1.23 | 1.09 | — | — |
| C[3] (35% in MEK) | — | — | 1.40 | 1.09 |
| Ex. 1[4] (39% in MEK) | — | 0.39 | — | 0.77 |
| MEK | 2.67 | 2.65 | 2.50 | 2.50 |
| HM-31 (pigment) | 5.02 | 5.02 | 5.02 | 5.02 |
| Ceralox | 0.25 | 0.25 | 0.25 | 0.25 |

[1]Hard Resin Binder A
[2]Soft Resin Binder B
[3]Resin C
[4]Example 1 polymer
*Percentages are by weight-all other values in kilograms A standard carbon black backside dispersion was coated onto a polyester substrate. The opposite side of the polyester substrate was coated with the above magnetic dispersions. Immediately prior to coating, a 2:1 myristic acid/butyl stearate solution (15.7% solids) was added to achieve a 2% myristic acid and 1% butyl stearate based on metal particle pigment and enough MONDUR™ CB-701 polyisocyanate curative (available from Miles Inc., 70% solids in THF) was added to achieve a 10% MONDUR™ CB-701 level (% of total binder) and the dispersion was mixed in a high shear mixer for approximately ten minutes. A reverse gravure coating method was used and the magnetic dispersion was coated at 68 (mpm) meters per minute. The coating was passed through a magnetic field to orient the particles. Two ovens were used to dry the magnetic coating. The first oven was set at 140° F. (60° C.) the second at 180° F. (82° C.). The cured media was calendared at 110° F. (43° C.) and 2100 Newtons per lineal centimeter pressure.

The % solids of the dispersion, the ICI viscosity of the dispersion and the Wyko RMS surface roughness of the resultant media are reported in Table 6. Lower Wyco values are indicative of a smoother surface.

TABLE 6

| Ex. | Binder* | % Solids | ICI Viscosity (cps) | Wyco RMS (nm) |
| --- | --- | --- | --- | --- |
| Comp. Ex. 5.1 | A$^1$/B$^2$ | 29 | 8 | 6.2 |
| Ex. 5.2 | A/B/Ex. 1$^4$ (3%) | 29 | 7 | 4.4 |
| Comp. Ex. 5.3 | A/C$^3$ | 31 | 13 | 6.9 |
| Ex. 5.4 | A/C/Ex. 1 (6%) | 30 | 9 | 5.8 |

$^1$Hard Resin Binder A
$^2$Soft Resin Binder B
$^3$Resin C
$^4$Ex. 1 oligomer
*Percentages are by weight The data in Table 6 demonstrate that the dispersants of the present invention reduce the viscosity of the magnetic dispersion and allow a smoother coating to be made.

Other embodiments of this invention will be made apparent to those skilled in the art from a consideration of the specification or from practice of the invention disclosed herein. Various omissions, modifications, and changes to the principles described herein may be made by one skilled in the art without departing from the true scope and spirit of the invention which is indicated by the following claims.

We claim:

1. A magnetic recording medium, comprising a magnetic layer provided on a nonmagnetizable substrate, wherein the magnetic layer comprises a polymeric binder and a magnetic pigment dispersed by a dispersant, wherein the dispersant comprises:

a non-halogenated vinyl oligomer wherein the oligomer comprises a plurality of pendant nitrile groups and at least one pendant dispersing group; wherein the oligomer has a glass transition temperature of about 60° to about 105° C. and a number average molecular weight of about 2000 to about 4000, and wherein the oligomer has a dispersing equivalent weight in the range from about 500 to about 3,000.

2. The magnetic media of claim 1 wherein the oligomer has a glass transition temperature of about 80° to about 105° C.

3. The magnetic media of claim 1 wherein the oligomer has a glass transition temperature of about 95° to about 105° C.

4. The magnetic media of claim 1 wherein the oligomer contains a hydroxyl group and has a hydroxyl equivalent weight of about 300 to about 10,000.

5. The magnetic media of claim 1 wherein the Tg of the magnetic layer is greater than about 70° C.

6. The magnetic media of claim 1 wherein the oligomer contains a hydroxyl group and has a hydroxyl equivalent weight of about 500 to about 5000.

7. The magnetic media of claim 1 wherein the oligomer contains a hydroxyl group and has a hydroxyl equivalent weight of about 800 to about 1500.

8. The magnetic recording medium of claim 1 wherein the magnetic layer comprises about 60 to about 85 percent by weight pigment, about 1 to about 6 weight percent dispersant, and about 4 to about 20 weight percent binder, based upon the total weight of pigment, dispersant, plus binder.

* * * * *

UNITED STATES PATENT AND TRADEMARK OFFICE
CERTIFICATE OF CORRECTION

PATENT NO.: 5,674,604

DATED: October 7, 1997

INVENTOR(S): Ramesh C. Kumar and Suman K. Patel

It is certified that error appears in the above-identified patent and that said Letters Patent is hereby corrected as shown below:

Column 4, line 5, insert "non" before "magnetizable."

Column 4, line 7, delete "in the polymers binder."

Column 16, line 10, after "dispersing" and before "equivalent" insert the word "group."

Signed and Sealed this

Twenty-eighth Day of July, 1998

Attest:

BRUCE LEHMAN

Attesting Officer

Commissioner of Patents and Trademarks